United States Patent [19]

Larsen

[11] Patent Number: 4,590,571
[45] Date of Patent: May 20, 1986

[54] ELECTRONIC MEASURING AND RECORDING APPARATUS FOR USE IN WHEELED VEHICLES

[76] Inventor: Ib Larsen, Fasanvaenget 5, Slagelse, Denmark, DK-4200

[21] Appl. No.: 619,398

[22] Filed: Jun. 12, 1984

Related U.S. Application Data

[63] Continuation of Ser. No. 314,053, filed as PCT DK 81/00021, Feb. 20, 1981, published as WO 81/02483, Sep. 3, 1981, §102(e) date Oct. 19, 1981, abandoned.

[51] Int. Cl.$^4$ .............................................. G07B 13/04
[52] U.S. Cl. .................................. 364/467; 235/30 R
[58] Field of Search ............... 364/424, 467, 561, 565; 235/30 R; 377/1, 15, 16, 19, 26, 20; 73/518, 519

[56] References Cited

U.S. PATENT DOCUMENTS

| | | | |
|---|---|---|---|
| 3,512,706 | 5/1970 | Bruce-Sanders | 235/30 R |
| 3,736,408 | 5/1973 | Kienzle et al. | 235/30 R |
| 3,937,933 | 2/1976 | Warkentin | 235/30 R |
| 4,118,775 | 10/1978 | Boyce | 364/467 |
| 4,160,155 | 7/1979 | Steele et al. | 364/467 |
| 4,167,040 | 9/1979 | Heritier et al. | 364/900 |
| 4,197,585 | 4/1980 | Moorey et al. | 364/565 |
| 4,205,388 | 5/1980 | Steiner | 235/30 R |
| 4,236,215 | 11/1980 | Callahan et al. | 364/424 |

FOREIGN PATENT DOCUMENTS

| | | |
|---|---|---|
| 00000444 | 1/1979 | European Pat. Off. . |
| 772678 | 4/1957 | United Kingdom . |

*Primary Examiner*—Gary Chin
*Attorney, Agent, or Firm*—Merchant, Gould, Smith, Edell, Welter & Schmidt

[57] ABSTRACT

An electronic measuring and recording apparatus for use in wheeled vehicles and comprising a clock (1) for generation of time pulses and a signal generating device (3) for generation of pulses corresponding to a distance travelled by said vehicle and a memory (5) for storage of data related to the drive of said vehicle. A proportional converter (4) of said apparatus converts distance pulses into standard distance pulses which are supplied to said memory which in turn is connected to a data transmitter (9) for transfer of data to external data recording or data processing equipment. The time pulses and the standard distance pulses are converted into time fare pulses and distance fare pulses, respectively, in said proportional converter (4) controlled by a fare program (6), a distance program (7), a program (8) for automatic change of fare, and a functional program (10). Said time fare pulses and said distance fare pulses are compared to one another for generation of debit pulses which are transferred to a program (14). Said program (14) inputs data into control registers (17) controlled by a time, start, and debit program (13), a fare register (15), and a day and night program (16). Said data are transferred to a main display (19), and a control display (20) through a display decoder (18). Operation of said apparatus is chosen by means of a selector (12) and an associated selector panel (11).

10 Claims, 5 Drawing Figures

ELECTRONIC MEASURING AND RECORDING APPARATUS FOR USE IN WHEELED VEHICLES

This is a continuation of application Ser. No. 314,053, filed as PCT DK 81/00021, Feb. 20, 1981, published as WO 81/02483, Sep. 3, 1981, § 102(e) date Oct. 19, 1981, now abondoned.

The present invention relates to an electronic measuring and recording apparatus for use in wheeled vehicles and comprising a clock, a signal generating device for generation of a signal corresponding to a distance travelled by said vehicles, and a price calculating unit for calculation of a price on basis of signals received from said clock and/or said signal generating device.

It is known to use taximeters in connection with cabs and certain kinds of transportation vehicles for calculation of a price for a distance travelled by said vehicle within a certain period of time on basis of a price for each unity of distance and on basis of a price for each unity of time, respectively. Usually, an electronic oscillator or another kind of clock is used for generation of a time pulse train, and said signal generating device is adapted to generate a pulse for a unit of distance travelled by said vehicles. From German published specification No. 1,259,129 an electronic taximeter is known, wherein said price calculation is carried out so that the price is determined by the distance pulses, when the price determined by said distance pulses in a predetermined period of time exceeds the price calculated on basis of said time pulse train, and so that the price is determined by said time pulse train, when the price for each unity of time exceeds the price determined by said distance pulses within the unity of time in question.

In connection with taximeters it is also known to change the fare, that means the price for each unity of distance, and the price for each unity of time as a function of the time of the day or of the year, so as to vary between day and night fares and between weekday and sunday/holiday-fares. From U.S. Pat. No. 3,736,408 a taximeter is known wherein the fare change is automatically controlled by time. The idea of this change between day and night fares or weekday and sunday/holiday-fares, respectively, is to make it more attractive for the cab drivers to work at periods of the day or the year, respectively, which hitherto have not been attractive to the drivers such as at night and on sundays or holidays.

One object of the present invention is to provide an electronic measuring and recording apparatus of the kind mentioned above which is far more universally applicable than any known apparatus and which makes it possible to provide information about utilization and profitability of the vehicle at different periods of the day or the year.

The electronic measuring and recording apparatus according to the invention is characterized in further comprising a memory for storage of data related to the drive of said vehicle and being a function of said signal generated by said signal generating device within predetermined periods of time determined by said clock.

However, such an electronic measuring and recording apparatus may also advantageously be used in other kinds of vehicles than taxies or cabs and transportation vehicles. In some countries apparatuses are used in connection with Diesel- or gas driven cars for registration of the total distance travelled by the car for calculation of tax for said car on basis thereof.

The electronic measuring and recording apparatus according to the invention may advantageously be adapted to integrate said signal produced by said signal generating device within periods of time determined by said clock, and be adapted to store a signal produced by integration of said signal and being representative of the distance travelled by said vehicles within the period of time in question. By selection of data related to the drive of a vehicle, especially in connection with cabs, the apparatus may preferably be adapted to compare a signal produced by said integration of said signal and being representative of the distance travelled by said vehicle within the period of time in question and at least one limit, and to generate and store a first or a second discrete signal depending on whether the value of said integrated signal is bigger or smaller than said limit, respectively. These discrete signals permit determination of the periods of time in which said vehicle has been in service and the periods of time in which said vehicle has been out of service, respectively. Selecting for example five minutes as the period of time, said limit may appropriately be selected corresponding to 100 m, whereupon the situation that a cab moves ahead in a row on a cab rank results in generation and storage of said first discrete signal corresponding to said vehicle being out of service. Such an apparatus which generates and stores a signal for determination of whether the vehicle has been in or out of service or operation, respectively, within a certain period of time may, advantageously, also be used in certain kinds of lorries for which apparatuses are prescribed for registration of when the vehicle has been in service or in operation. Within the EEC all export lorries are prescribed to use such apparatuses.

The electronic measuring and recording apparatus according to the invention may additionally or alternatively be adapted to generate a signal representative of the average speed of the vehicle within the period of time in question from a signal produced by said integration, and to store said average speed signal. Thereby it is rendered possible by output of the data stored in said memory to carry out a statistical treatment of these data in order to calculate time expenditure for distances travelled by said vehicle, and/or to decide if said vehicle may have exceeded a speed restriction either a general speed restriction for all kinds of vehicles, or a special speed restriction for that particular kind of vehicle.

The electronic measuring and recording apparatus according to the invention preferably comprises a data transmitter to transmit data stored in said memmory to a data recording or data processing unit controlled by said clock. Depending on the data themselves as well as the data recording or data processing operation, different kinds of units may be employed such as printers, tape recorders, transmitters or the like.

However, since a transportation vehicle is very often manned with one or more helpers in addition to the driver it has proved inconvenient to use the conventional account principle described above wherein price calculation is based either on a distance travelled by said vehicle within said predetermined period of time determined by said clock, or on said predetermined period of time. Therefore, it is desirable that the measuring and recording apparatus calculates the account price based on a time rate for the driver and the helpers as well as on the distance travelled by said vehicle.

The account principle described above is implemented in the known taximeters in several different ways. In the above mentioned German published specification No. 1,259,129 a flip-flop and an AND gate cooperate for blocking one time pulse for each distance pulse supplied. However, in spite of the simplicity of the circuitry the taximeter suffers from the fault that by simultaneous supply of a distance pulse and a time pulse the taximeter falsely blocks the following time pulse and thereby introduces an error in the price calculation.

The electronic measuring and recording apparatus according to the invention permits highly accurate calculation on basis of both account principles mentioned above. Therefore, the price calculation unit of the electronic measuring and recording apparatus according to the invention may be adapted to calculate a price for a distance travelled by said vehicle on basis of a price for each of the periods of time determined by said clock and on basis of a price for a unity of distance, and a total price for a distance travelled by said vehicle within an interval of time by adding for each interval of time the price for said interval and optionally either the price for the distance travelled by said vehicle within the period of time in question or the difference between the distance price and the time interval price.

Known taximeters comprise registers or counting means for cumulativ registration of data for said vehicle. Conventionally, the taximeter is adapted to register the total distance travelled by said vehicle, the distance being paid for, the number of tours, and the total amount earned by said vehicle.

Therefore, in order to provide more adequate information concerning the drive of said vehicle, the electronic measuring and recording apparatus according to the invention may further comprise a register for registration of time, a register for registration of the distance travelled by the vehicle in occupied condition, a register for registration of the driver's account, and a register for registration of the amount debited for the tour in question or the last tour. Registration of data from the registers or counting means has hitherto been carried out by simple reading of said registers or counting means. Thus, writing of receipts for passengers of cabs has hitherto basically been carried out thereby that the driver of the cab reads the price on the taximeter and manually writes a receipt. Especially in this connection it has been desirable to provide an automatic, falseless output from said taximeter of the cab.

Therefore, the measuring and recording apparatus according to the invention may be adapted to output said data stored in said registers at predetermined times and to transfer said data to said data transmitter. Said selector may further be adapted, when activated, to cause the apparatus to output said data stored in said registers and to transfer said data to said data transmitter. Therefore, it is preferred that the external data recording and data processing unit is equipped with a printer for printing receipts and comprising a calender program for dating the receipt printed by said receipt printer and a register for storage of a number characterizing the vehicle, for example the registration number of said vehicle. Said receipt printer may advantageously be adapted so that supply of external data, for example by way of a keyboard or a transmitter causes printing of special characteristics or conditions. In connection with cabs such characteristics or conditions may, for example, include special extra fare for transportation of luggage, bicycles, more than one passenger etc., and in connection with transportation vehicles they may include an indication of the number of helpers and/or use of a trailer. Finally, said receipt printer may advantageously be equipped with a card reader for reading a driver's card including data for identification of the driver, and for reading a customer's credit card and selected data from said card may then be stated no the receipt.

German published specification No. 1,774,560 discloses an electronic taximeter including a signal generating device comprising a housing, which is adapted to be inserted in and connected to the speedometer linkage of the vehicle. A magnetic reed contact and a rotatable magnetic armature is mounted within said housing, said armature being connected to and driven by the speedometer linkage of said vehicle. By rotation of the magnetic armature the reed contact is activated by connection of a voltage source for generation of a pulse. The number of pulses generated for each revolution of said speedometer linkage is determined by the number of poles in said magnetic armature. However, said signal generating system suffers from one main fault. Since by nature the system is a high impedance system, possible external noise sources may occasionally generate signals in the connection cable of the signal generating device and thereby falsely activate the taximeter connected thereto. The use of conventional noise filters may to some extent eliminate this problem. However, if such noise filters are dimensioned to an optimum in regard to suppression of noise, this results in an unacceptable power consumption when said reed contact is closed. As mentioned previously, the number of pulses generated for each revolution of the speedometer linkage is determined by the number of magnetic poles in said magnetic armature and, therefore, the accuracy of conversion from distance travelled to pulses generated and supplied may be increased by increasing the number of magnetic poles in said magnetic armature. However, this increases the risk of false generation of pulses since slight oscillating movement of the magnetic armature relative to said reed contact at a position at or close to an activation position may result in generation of pulses not corresponding to a distance travelled by the vehicle. Such generation of false pulses may, for example, take place when the vehicle is started after a stop at a traffic light on an upwardly sloping road.

Therefore, it is desirable to use a signal generating device in connection with the measuring and recording apparatus according to the invention, which signal generating device has firstly an extremely low power consumption, secondly a very high immunity to external noise sources, and thirdly no tendency to generate false pulses. Therefore, the signal generating device according to the invention may comprise a second reed contact, and the two reed contacts may then be mounted at an angular distance of 90° relative to the rotational axis of said speedometer. The reed contacts may be adapted to shift between a neutral position and an activated position in which the moveable contact elements of said reed contacts are connected to a low potential and a high potential, respectively. The signal generating device according to the invention may further comprise a blocking circuit adapted to block the admission of pulses while said speedometer linkage is rotating from one of said two reed contacts after supply of one pulse, and simultaneously to open for supply of pulses from the other reed contact.

In contrast to mechanical measuring and recording apparatuses, the recording of the total distance travelled by a vehicle results in several problems when an electronic measuring and recording apparatus is used, and this problem arises from dependency of a power supply. Thus, it is difficult to effectively seal the power supply cord of the apparatus, and therefore, a spare power supply is required in order to maintain the data stored in the memory and in the registers, and in order to provide continuous recording of the total distance travelled by the vehicle. Therefore, according to the present invention an electronic measuring recording apparatus is provided comprising rechargeable NiCd batteries, which, resulting from an extremely low power consumption, permit operation of the circuitry necessary for recording of the total distance travelled by the vehicle up to several weeks after a disconnection from the electrical power supply of the vehicle.

In accordance with the present invention an electronic measuring apparatus has been provided which, in addition to the advantages mentioned above, has a substantial advantage in relation to manufacture and storage, compared to known taximeters, because the very universal measuring and recording apparatus according to the invention may be used in a great variety of vehicles in which the different combinations of the potential functions of the apparatus may be employed.

The invention will now be further described in detail with reference to the accompanying drawings, in which.

Figure 1:
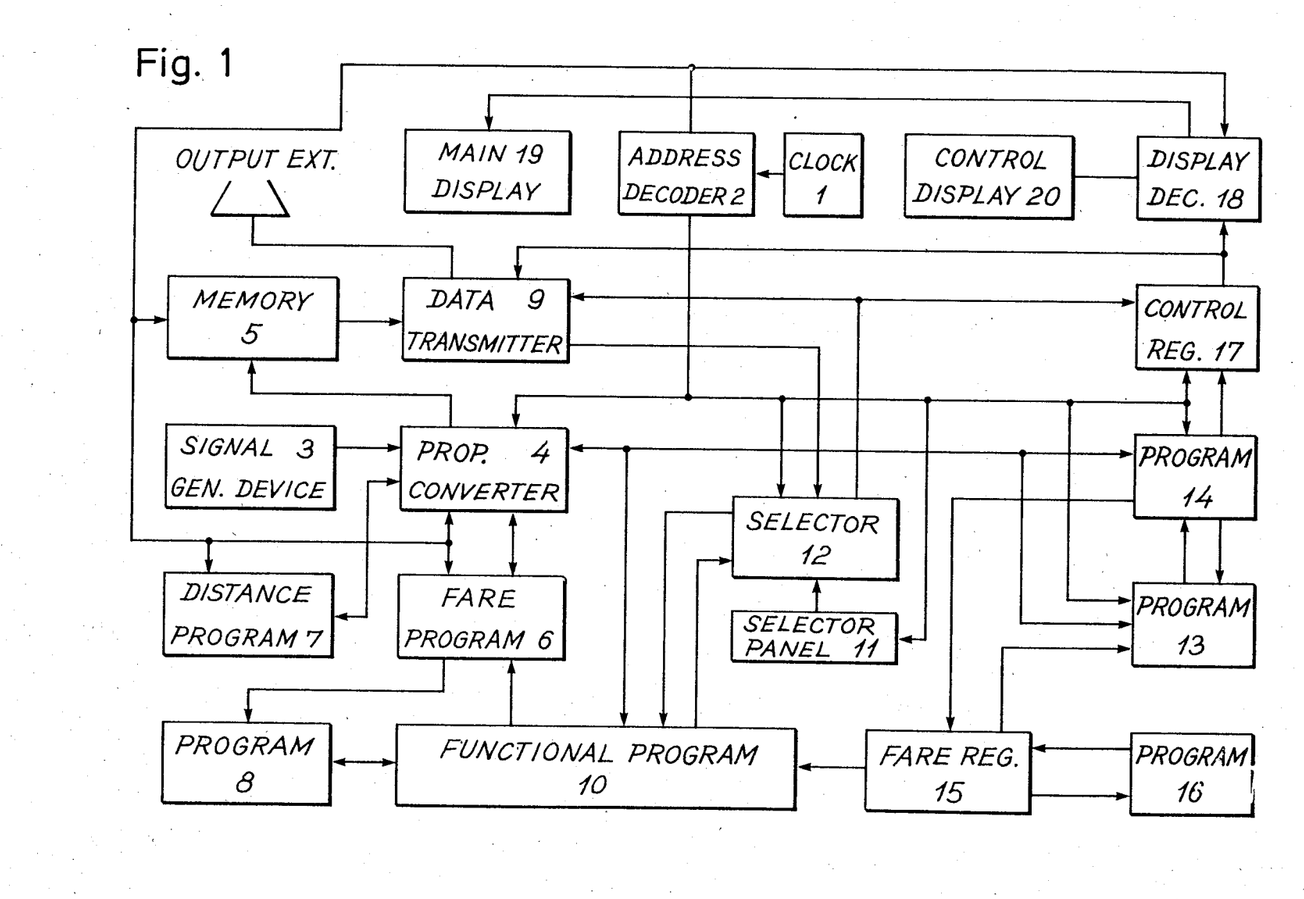
FIG. 1 is a block diagram of a preferred embodiment of the electronic measuring and recording apparatus according to the invention.

FIG. 1 shows a block diagram of a preferred embodiment of an electronic measuring and recording apparatus for use in wheeled vehicles according to the invention. The reference numeral 3 is a signal generating device which will be described in greater detail below, and which generates and supplies a signal corresponding to a distance travelled by the vehicle. The signal generated and supplied by said signal generating device 3 comprises a series of individual pulses thus forming a digital signal, and is transmitted to a proportional converter 4 also to be described in greater detail below. The proportional converter further receives time pulses and controls data from an oscillator or clock 1 and from an address decoder 2, respectively. The proportional converter 4 is adapted to convert said pulses generated and supplied from said signal generating device 3 into standard pulses corresponding to a predetermined distance, for example 1 m. The standard distance pulses are transmitted from said proportional converter 4 to a driving time memory 5, also to be described in greater detail below. The memory 5 processes the standard distance pulses generated and supplied by the proportional converter 4, and generates and stores data relating to the drive of said vehicle within predetermined periods of time determined by said clock or oscillator 1 by admission of time pulses from said clock or oscillator 1. The driving time memory is further adapted to output and transfer data stored in said memory to a data transmitter 9 adapted to transfer data to external equipment for recording, transmission, or processing said data. Said external equipment may, for example, comprise a printer, a tape recorder, a transmitter, or the like.

The electronic measuring and recording apparatus according to the invention comprises a central functional program 10 for controlling the functions of said apparatus. Said functions are selected by means of a selector 12 and an associated control panel 11. However, the function program 10 also controls certain functions in said selector 12 which will be explained below. In addition to the standard distance pulses the proportional converter 4 also generates distance fare pulses and time fare pulses on the basis of the said standard distance pulses and the time fare pulses, respectively, and by comparing said distance fare pulses and said time fare pulses the proportional converter 4 generates a series of debit pulses. Thus the proportional converter 4 is connected to said functional program 10 for transmission of control data to and from said program and to a fare program 6 and an associated distance program unit 7 which controls the conversion in the proportional converter 4 of said distance pulses generated and supplied by the signal generating device 3 into standard distance pulses. The fare program 6 controls the generation of said distance fare pulses and said time fare pulses as well as the generation of said debit pulses. The program 6 is also connected to a program 8 which automatically controls fare changes. Thus, after generation of a predetermined number of debit pulses or distance pulses, the output of the program 8 may via said functional program 10 cause automatic fare changes and/or stop the generation of debit pulses on the basis of data transferred from said fare program 6. The generation of said debit pulses in the proportional converter 4 may be carried out in two different ways, either by adding the number of distance fare pulses and time fare pulses within a predetermined period of time determined by said clock or oscillator 1, or by adding the number of time fare pulses to any difference between the number of distance fare pulses and time fare pulses, assuming such difference is bigger than zero.

The debit pulses generated in said proportional converter 4 are transferred into a program 14. The program 14, which is controlled by a time, start, and debit program 13, is adapted to control the input of data into a number of control registers 17 based on the debit pulses supplied from said proportional converter 4, and on said time pulses supplied from said oscillator or clock 1, and on the address decoder 2. The number of control registers may vary. However, in the preferred embodiment of the electronic measuring and recording apparatus according to the invention said number is eight. A first register is used for storage of said time pulses produced by said oscillator 1, or in plain words for registration of time. A second register is used for registration of the number of tours, a third register for registration of the total distance travelled, a fourth register for registration of the distance travelled with passengers or goods (when the vehicle is a transportation vehicle), a fifth register for registration of the distance being paid for or the distance travelled with a trailer (when the vehicle is a transportation vehicle), a sixth register for registration of the total amount earned, a seventh register for registration of the driver's account or special kinds of transportation, and an eighth register for registration of the amount earned in connection with the latest tour.

In an alternative embodiment of the present invention said seventh register is used for registration of the earning at a different theoretical fare, which may, for example, differ from the normal fare in being varied by time. Thereby it is possible to perform an analysis of the earning possibilities in connection with different fare systems, for example time controlled variations of fare.

The program 14 inputs data to the registers 17 derived from the debit pulses supplied from said proportional converted 4, and from data supplied from said address decoder 2 as explained above. The program 14 is controlled by said time, start, and debit program 13 analogously to the way in which the fare program 6 and the distance program 7 control the proportional converter 4. When said selector 12 is activated, the program 14 inputs a start fare into the register number 6 and into the register number 8, whereby any data stored in said register number 8 are erased, and an amount in the register number 7 corresponding to the driver's share of said start fare. One single digit is also supplied to said register number 2 and an addition of distance pulses is carried out in the register number 5 and in said register number 4, assuming the vehicle is occupied by passengers or goods. The basic price calculation is made in the program 14, whereby said program inputs a certain amount in the registers number 6 and 8 and determined by the program 13 by supply of a predetermined number of debit pulses from said proportional converter 4. The driver's share of said amount is also input to register number 7. Thus, said predetermined number of debit pulses determines the fare or price which a customer has to pay for a predetermined distance travelled by said vehicle and/or a certain predetermined period of time in which said vehicle has been occupied. In the electronic measuring and recording apparatus according to the invention change of fare may be performed in three different ways. Firstly, the conversion in said proportional converter 4 of distance pulses and time pulses to distance fare pulses and time fare pulses, respectively, be varied. Secondly, the number of debit pulses supplied from said proportional converter 4 to the program 14 and determining an input of a certain amount in said registers number 6 and 8, may be varied, and thirdly, said certain amount, which is input to said register, may be varied. Such change of the fare may be performed automatically by means of the time, start, and debit program 13, and by means of a time controlled fare register 15 and a day and night program 16. As previously mentioned, the program 14 inputs the time pulses supplied from the clock or oscillator 1 into said register number 1, and these data corresponding to actual time of the day are also transferred to the time, start, and debit program 13 and to the fare register 15. The fare register 15 compares the actual time of the day with one or more times of the day or night and a number of predetermined dates determined by said day and night program 16 for performing day and night fare changes and every day and sunday/holiday fare change, respectively. In addition to changing the fare or the price which a customer has to pay for a predetermined distance travelled by said vehicle and/or a fixed predetermined period of time, the programs 13 and 15 change the start fare which is input to the registers numbers 6 and 8 by means of the program 14, and also change the driver's account which is input to said register number 7, and which is determined as a share of both the start fare and the fare paid by a customer for a predetermined distance travelled by said vehicle and/or a fixed predetermined period of time.

By operation of said selector 11 shifting to and from "free", the data stored in said registers 17 are output and transferred to said data transmitter 9 for transmission to said previously mentioned data equipment, not shown in the drawings. However, said output and said transfer of data may, of course, be performed in any other way, for example by supply of a control signal from said external data equipment, especially from a transceiver.

As already mentioned above said functional program 10 is adapted to control certain functions of said selector 12, whereby the functional program 10 compulsorily controls the sequence of the functions of said apparatus and thereby blocks illegal use of the said apparatus. Thus a taximeter conventionally has to be shifted to a position "payment", before shifting to a position "free".

For displaying the data stored in said registers 17 two displays 19 and 20 are provided, said displays being designated the main display, and the control display, respectively. Depending on the application of the electronic measuring and recording apparatus according to the invention said displays may be mounted in one single housing, also containing other components of said apparatus, or the displays may be arranged at different locations. For some applications the main display 19 may be omitted. The output from said registers 17 and the input into the displays 19 and 20 are controlled by a display decoder 18 which in turn is controlled by the address decoder 2. The display decoder 18 is preferably constructed so that the main display 19 may display exclusively the amount earned in connection with the tour in question provided that the apparatus is activated or is in a "payment" position, while the main display cannot be employed for displaying purposes when the apparatus is in a "free" position, and so that the control display 20 may be employed for control purposes only when the apparatus is in a "free" position. Control displaying at the display 19 is performed by activating the selector 11 so that the data stored in said registers numbers 1–8 are output in turn and displayed on said display. Provided that the displays 19 and 20 are mounted in the same housing, the display decoder 18 is preferably constructed so that the control display 20 may display only the data stored in said register number 1, i.e. the time, when the main display 19 is being employed for displaying purposes. This construction of the display decoder 18 and of the displays 19 and 20 is very important since it becomes possible to control, if the fare used corresponds to the time of the day or the night and/or the date, so that misleading of the customers and price swindle is effectively prevented. In case the main display 19 is mounted separated from the housing of the apparatus and from the control display 20, for example at the back seat of a cab, the display decoder 18 is preferably constructed so that the control display 20 will display the same as the main display 19, i.e. the amount earned, when the apparatus is activated. However, the main display 19 may be constructed so that some digits at the display are being employed for displaying certain extra fares or the distance travelled at the respective tour.

Figure 2A:
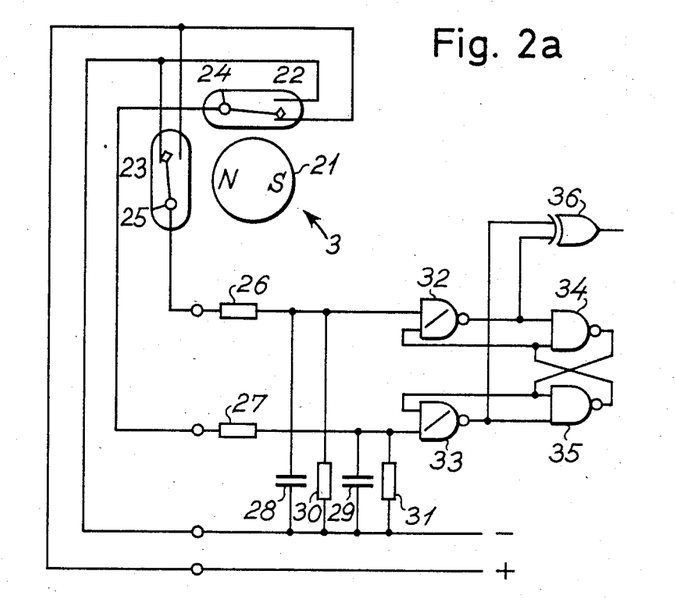
FIGS. 2a and 2b illustrate a signal generating device of the block diagram shown in FIG. 1.
Figure 2B:
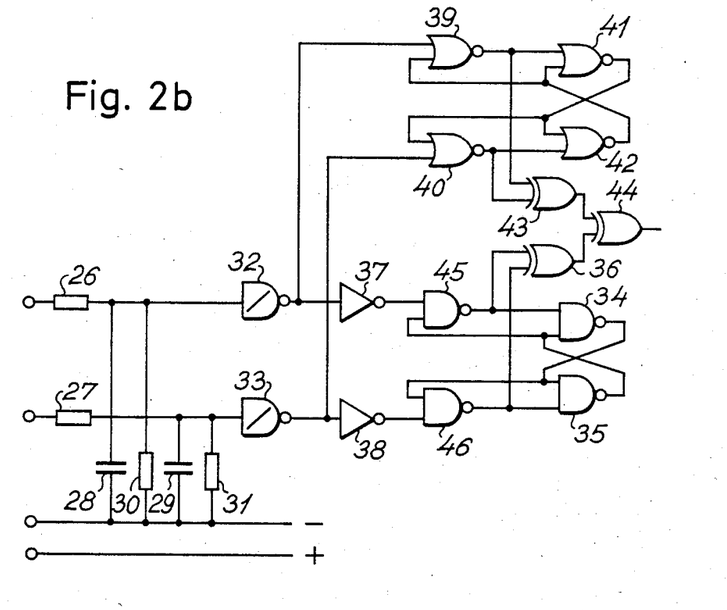

In FIGS. 2a and 2b show a signal generating device indicated in FIG. 1 and designated by 3. A magnetic armature 21 comprising a North pole N and a South pole S is connected to and driven by the speedometer linkage of the vehicle in a manner known per se, so that the armature 21 rotates one revolution for each revolution of said speedometer linkage. Two reed contacts 22 and 33 comprising movable contact elements 24 and 25, respectively, are mounted uniformly spaced from the armature 21 and at an angular distance of 90° relatively to one another. The said reed contacts are connected to two potentials, one high (+) and one low (−), so that in their unenergized conditions said elements are connected to said low potential (−) and so that by activation said contact elements are switches to said high potential (+). The said reed contacts are activated twice each revolution of the armature and thus generate a total of four high potential (+) pulses for each revolution of the armature 21. In the drawings the contact element 25 of the reed contact 23 is shown in its unenergized condition, while the contact element 24 of the reed contact 22 is energized and thus connected to said high potential (+).

The movable contact elements 24 and 25 of the reed contacts 22 and 23, respectively, are connected to identical input resistors 26 and 27, respectively, at the input of the electronic measuring and recording apparatus according to the invention. The said input resistors 26 and 27 are connected to ground through identical capacitors 28 and 29, and identical resistors 30 and 31, respectively. If that the movable contact element of the reed contact is connected to any of the potentials (+ or −), the signal generating system is of a low impedance type, and therefore noise may only be introduced into the signal generating device and thus into the apparatus according to the invention within that period of time, in which either the movable contact element 24 of the reed contact 22 or the movable contact element 25 of the reed contact 23 are being switched, since within this particular period of time the signal generating system is of a high impedanced type. The RC-constant of the RC networks 26, 28, and 27, 29, respectively, are chosen bigger than the operating time of said reed contacts, for example 1 ms. A high degree of immunity to noise originating from external sources is thus obtained.

The value of said resistors 26 and 27 determines the power consumption, and if said value is chosen to be 200 kΩ said power consumption becomes extremely low. Thus, the value of said capacitors 28 and 29 will be 5nF, and the resistors 30 and 31 are appropriately 10MΩ, the resistors being intended exclusively to discharge said capacitors 28 and 29, respectively, when the signal generating device is disconnected, for example when it is assembled or disassembled.

The input resistors 26 and 27 shown in FIG. 2a are also connected to a first input of a gate 32 and a first input of a gate 33. The said gates 32 and 33 are appropriately in the form of Schmitt triggers and connected to both a set reset flip flop and a gate 36, said set reset flip flop consisting of a gate 34 and a gate 35. The output of said gate 35 is as shown in the drawings connected to a second input of said gate 32 and an input of said gate 34 and the output of said gate 34 is connected to a second input of said gate 33 and an input of the gate 35. By way of introduction it is assumed that the first input of said gate 32 and the first and the second input of said gate 33 are low, and that the second input of said gate 32 is high. Therefore, the outputs of said gates 32 and 33 are high, and the output of said gate 36 is low. Assuming that after energizing said reed contact 23 the armature 21 continues to rotate and energizes the reed contact 32, the situation shown in FIG. 2 appears. After charging the capacitor 28 the first input of said gate 32 goes high, and the output of said gate 32 goes low. Thus the output of the gate 36 goes high. As it is well known to a person skilled in art supply of one pulse to the set reset flip flop 34, 36 results in that the second input of said gate 33 goes low and that the second input of said gate 33 goes high so that the output of the gate 32 goes high, and the output of the gate 36 goes low. The net result of supply of a pulse to the first input of said gate 32 is the generation of a pulse at the output of said gate 36 the width of said pulse being determined by the delay constants in said set reset flip flop 34, 36, and in said gate 32, and in blocking of said gate 32 and opening of said gate 33. Continuous rotation of the speedometer linkage energizes the reed contact 23 after a rotation of said armature approximately 90°, and the sequence described above is repeated.

The signal generating system shown in FIG. 2a generates, a total of four pulses for each revolution of said speedometer linkage. If the circuitry described above is enlarged by adding inverters 37 and 38 and gates 39, 40, 41, 42, 43, 44, 45, and 46 as shown in FIG. 2b, a total of eight pulses for each revolution of said speedometer linkage is produced at the output of said gate 44, the input of which is connected to outputs of said gates 36 and 43.

Figure 3:
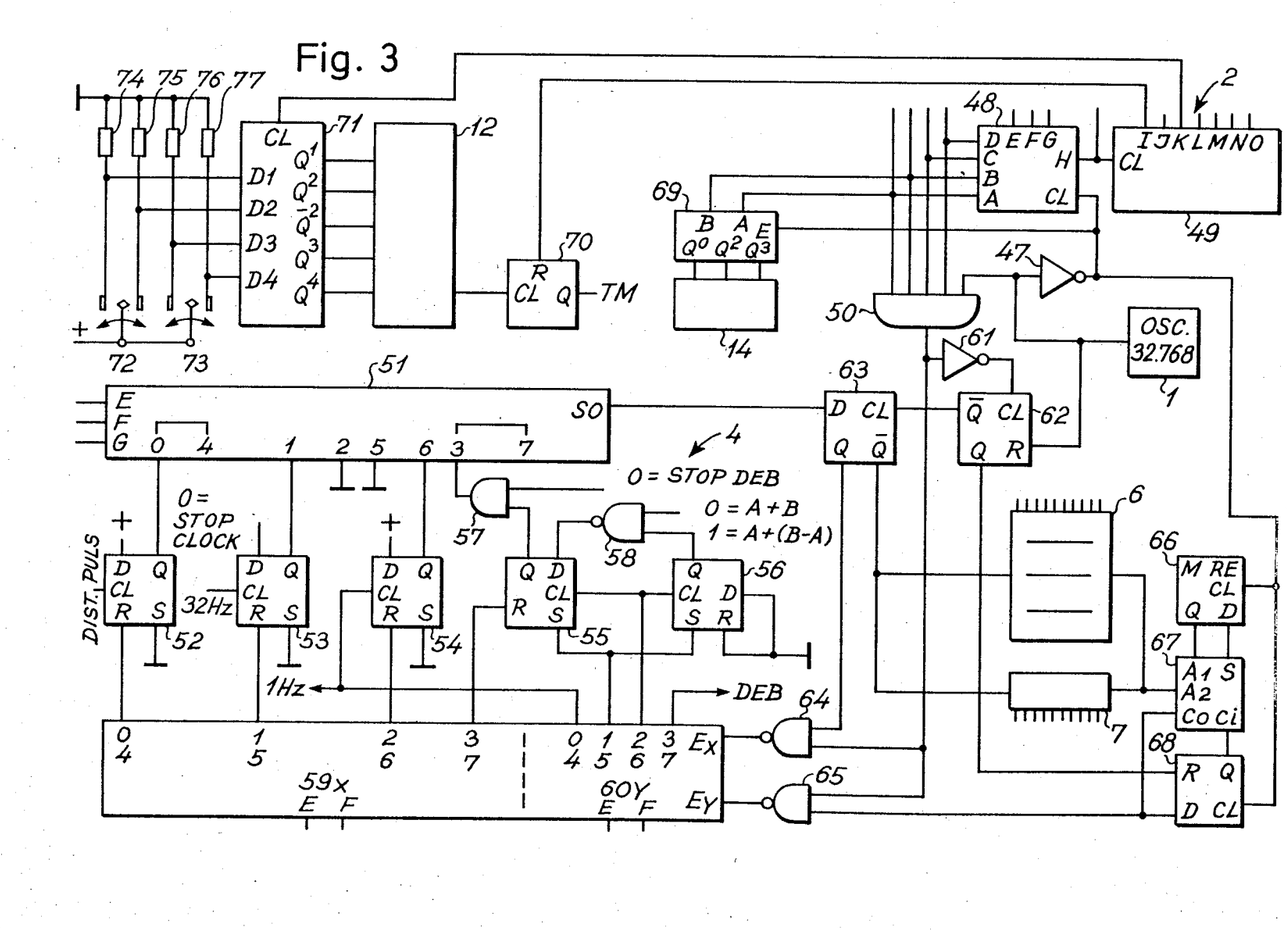
FIG. 3 is a proportional converter employed in the block diagram shown in FIG. 1.

In FIG. 3 the proportional converter 4 and the address decoder 2 shown in FIG. 1 is shown in greater detail. The clock or oscillator 1, also shown in FIG. 1 generates and supplies pulses of a frequency of 32,768 kHz. The pulses generated and supplied by the clock or oscillator are transferred to a Cl-input of an eight bit binary synchronous counter 48 through an inverter 47. The counter 48 generates at its outputs A, B, C, D, E, F, G, and H pulses of frequencies 16,384 kHz, 8,192 kHz, 4,096 kHz, 2,048 kHz, 1,024 kHZ, 512 Hz, 256 Hz, and 128 Hz, respectively. The H-output of said synchronous counter 48 is connected to a Cl input of a seven bit ripple counter 49 supplying at its outputs I, J, K, L, M, N, and O pulses of frequencies 64 Hz, 32 Hz, 16 Hz, 8 Hz, 4 Hz, 2 Hz, and 1 Hz, respectively. The A, B, C, and D outputs of the synchronous counter 48 and the output of said clock or oscillator 1 are connected to inputs of a gate 50 generating one pulse every sixteen pulses supplied from the clock or oscillator. The output of said gate 50 is connected to an input of an inverter 61 and to first inputs of two gates 64 and 65, respectively. The output of said inverter 61 is connected to a Cl-input of a flip flop 62, the R input of which is connected to the output of the clock or oscillator 1. The Q and $\bar{Q}$ output of said flip flop 62 are connected to a R input of a flip flop 68 and a Cl input of a flip flop 63, respectively. The Q output of said flip flop 63 is connected to the second input of said gate 64, and the $\bar{Q}$ output of said flip flop 63 is connected to the fare program 6 and associated distance program 7, shown in FIG. 1. The flip flop 68 is connected to an adder 67 and a 64×1 bit shifting register 66 and is at its Cl input together with the corresponding input of said shifting register 66 supplied with pulses from the output of said inverter 47. The adder 67 is supplied with pulses from said previously mentioned programs 6 and 7. The $C_o$ output of said adder 67 is connected to a second input of said gate 65 and A to D input of said flip flop 68. The fare program 6 and the distance program 7 as well as the proportional converter 4 are supplied with pulses from said synchronous counter 48 and from said ripple counter 49, and said pulses controls, as already mentioned, the operation of said proportional converter 4 and said programs 6 and 8 by serial turn around of addresses therein.

In the preferred embodiment of the electronic measuring and recording apparatus according to the invention the programs 6 and 7 include a PROM (Programable Read Only Memory). However, the programs 6 and 7 may include a RAM (Random Access Memory) in order to input data thereto from outside, for example by means of a transceiver, a tape or card reader so that the programs 13, 15, and 16 shown in FIG. 1 may be omitted. The proportional converter 4 contains a multi channel unit 51, which, as previously mentioned, is supplied with pulses from the E and F outputs of said synchronous counter 48, five flip flops 52, 53, 54, 55, and 56, two gates 57 and 58, and two address decoders 59 and 60 also being supplied with pulses from the E and F outputs of said synchronous counter 48 and being connected to the output of said gate 64 and the output of said gate 65, respectively. At its Cl input the flip flop 52 is supplied with distance pulses from the signal generating device 2. Supply of such a pulse causes the output of said flip flop 52, which is connected to the O input of said unit 51, to go high at the positive flank of said pulse. When the address in the unit 51 is O, the output $S_o$ of said unit assumes the same value as the O input, i.e. after supply of a pulse to the flip flop 52, the output is high. The $S_o$ output of the unit 52 is connected to a D input of the flip flop 63. When the address shifts to O, the Cl input of said flip flop 62 goes high, whereupon the $\overline{Q}$ output of said flip flop 62 and the Cl input of said flip flop 63 goes low and the Q output of the flip flop 62 goes high thereby resetting the flip flop 68. Once the output of the clock or oscillator goes high said flip flop 62 changes so that the $\overline{Q}$ output of said flip flop 63 goes low activating said program 6. Since both the outputs E and F on said synchronous counter 48 are low, a separate, programable sixteen bit constant code is activated, serially being added to the result in said shifting register. After fifteen and a half pulse, when a serial turn around is ended at the next flank, the inputs of said gates 64 and 65 are both high.

Since the Q output of said flip flop 63 is connected to the second input of the gate 64, the output of said gate 64 goes low resulting in that the O output of said decoder 59 goes high thereby putting said flip flop 52 in a ready position. If the addition results in carrying a number, the $C_o$ of said adder 67 goes high shifting the output of the gate 65 low, thereby shifting the O output of said decoder 60 high and the said flip flop 54. The distance pulses supplied from the signal generating device 2 are converted at address number 0 into standard distance pulses, for example 1 meter pulses.

At the next address the time pulses (for example supplied from the J output of said ripple counter 49) are in a similar way converted into time fare pulses by means of the codes in the program 6 and through said adder 67 and said shifting register 66 whereby the Q output of said flip flop 53 determines whether an addition is to be carried out at said address. At the next address standard distance pulses supplied to the Cl input of said flip flop 54 are converted into distance fare pulses in a similar manner, and through said decoder 60 the time fare pulses and distance fare pulses are supplied to the S and Cl inputs of said flip flops 55 and 56, respectively. Assuming that the input shown open of said gate 58 is low the two series of pulses are added and transferred to the output 3 of said decoder 60 through the gate 57, the unit 51, the flip flop 63, the program 6, the adder 67, the shifting register 66, and the gate 65. From said output 3 of the decoder 60 the debit pulses thus generated are transferred to the program 14 as described above in connection with FIG. 1. Assuming that the open input of said gate 58 mentioned above is high, the number of time fare pulses is only added to the number of distance fare pulses assuming the number of distance fare pulses exceeds the number of time fare pulses, because a distance fare pulse zerofills the D input of said flip flop 55 through the gate 58 so that not until a succeeding distance fare pulse is supplied, an addition is carried out.

It is significant that the program 14 is constructed and operates basically in the same way as the proportional converter 4, thus by serial turn around of the addresses of said program inputs data in said registers 17 whereby said input is controlled by the time, start and debit program 13 and the decoder 69 in a way similar to the way the programs 6 and 7 control the turn around of said proportional converter 4.

Furthermore, FIG. 3 shows the selector 12 and the control panel 11. The control panel 11 comprises two two-way tuckle switches 72 and 73 supplying by activation voltage to inputs D1, D2, D3, and D4 of a 4x1 flip flop through input resistors 74, 75, 76, and 77, respectively. The Cl input of said flip flop 71 is connected to the K output of said ripple counter 49 and is thus supplied with pulses of a frequency of 16 Hz. By this it is guaranteed that switching said selector 12 connected to outputs $Q^1$, $\overline{Q^2}$, $Q^2$, $Q^3$, and $Q^4$ of the flip flop 71 may only take place when all preceding address outputs are low. By constructing the selector so that switching to and from "free" generates a pulse supplied to a flip flop 70 which is reset by a pulse supplied from the I output of said ripple counter 49, the signal generated at the output of said flip flop 70 corresponds to the transmission time of all data stored in said registers number 1–8.

Figure 4:
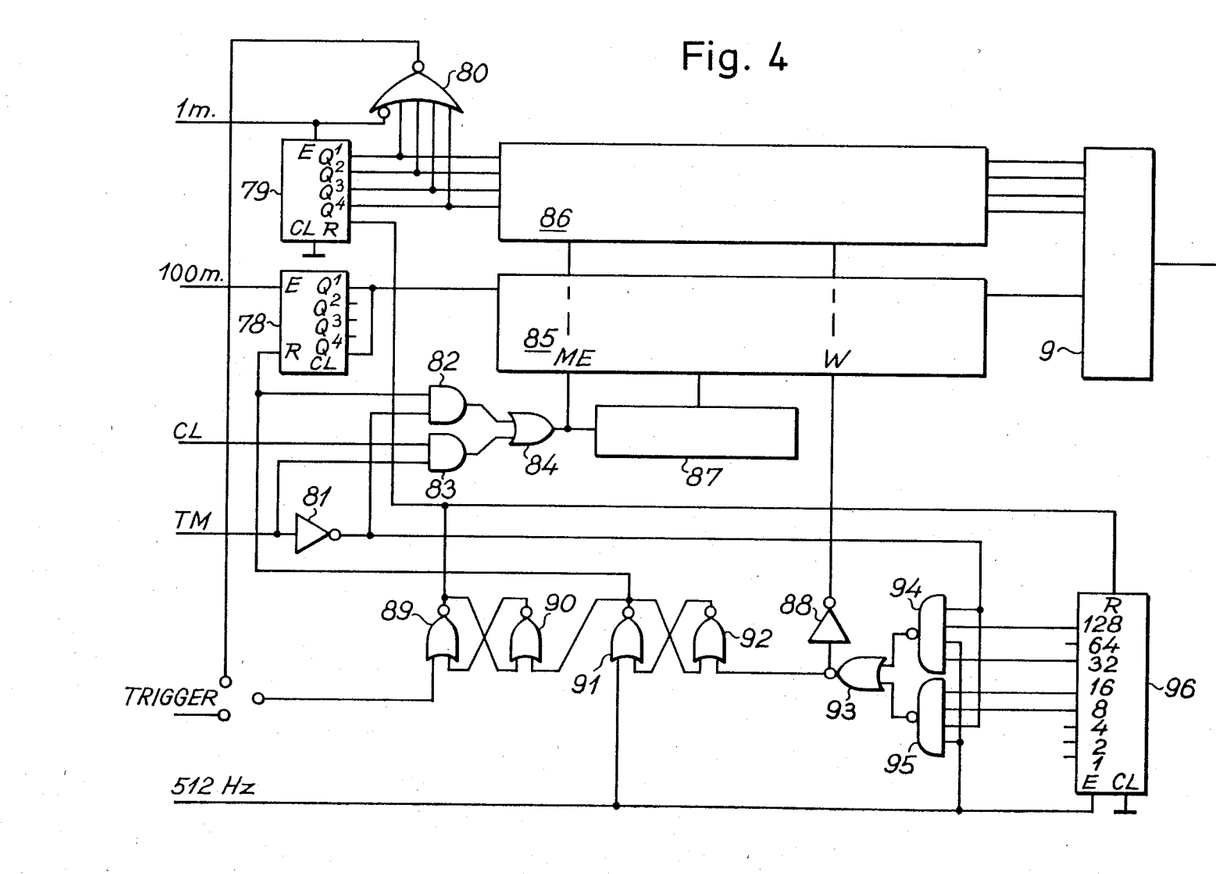
FIG. 4 is a driving time memory employed in the block diagram shown in FIG. 1.

In FIG. 4 the memory 5 shown in FIG. 1 is shown in greater detail. The memory 5 comprises two binary counters 78 and 79 being supplied with 10 or 100 m pulses and 1 m pulses, respectively, from the O output of said decoder 60, whereby a counter for conversion of the 1 m pulses supplied from the decoder 60 into 10 or 100 m pulses is inserted between said O output and the input of said counter 78. The $Q^1$ output of the counter 78 is connected to the Cl input of said counter 78 and an input of a store 85. The outputs of said counter 79 designated $Q^1$, $Q^2$, $Q^3$, and $Q^4$ are connected to corresponding inputs of a second store 86 and also to inputs of a gate 80 being supplied with 1 m pulses through an inverter. However, although the construction described herein comprises two binary counters 78 and 79 and corresponding stores 85 and 86, respectively, an actual memory normally only comprises either the first storage section consisting of the counter 79 and the store 85, or the second storage section consisting of the counter 79 and the store 86.

The memory also includes a binary counter 96 being supplied with Cl pulses from the F output of said synchronous counter 48, thus being supplied with pulses of a frequency of 512 Hz. In order to permit registration at short intervals of the speed of said vehicle, the following calculation has been carried out. A speed of 10 km/h corresponds to a distance of 1 m travelled within 360 ms. A frequency of 512 Hz corresponds to a period of 1,953125 ms, thus 184 of said 512 Hz pulses approximately correspond to 360 ms. Consequently, the output of said binary counter 96 together with an output of an inverter 81 to be described below and the F output of said synchronous counter 48 are connected to inputs of two gates 94 and 95 being connected to a gate 93 as shown in the drawings. Assuming that the output of said inverter 81 is high, the output of said gate 93 goes high after supply of 184 pulses as the succeeding Cl pulse goes high, whereupon the said output of said gate 93 once again goes low as the Cl pulse goes low. The output of said gate 93 is connected to said stores 85 and 86 through an inverter 88. When the output of said gate 93 goes high, the output of said inverter 88 goes low so that the result or results at the output or outputs of said counter 78 and said counter 79 is or are input to said store 95 and said store 96, respectively. The output of said gate 93 is also connected to an input of the set reset flip flop comprising two gates 91 and 92 and being supplied with 512 Hz pulses at a second input. The output of said set reset flip flop is connected to a reset input of said counter 78 and to an input of a second set reset flip flop comprising two gates 89 and 90 and being supplied with pulses designated trigger pulses at its second input as to be described below in greater detail. As the output of said gate 93 goes high the output of said gate 92 goes low. As the Cl pulse once again goes low both inputs of said gate 91 go low in a short period of time determined by the delay of said gates 92, 93, and 94/95, thus the output of said gate 91 goes high, so that the set reset flip flop 91, 92 is switched thus resetting the counter 78. The set reset flip flop 89, 90 is through its output connected to a reset input of said counter 79 and to a reset input of said counter 96, both being reset when said counter 78 is reset. The succeeding positive Cl pulse shifts the set reset flip flop 91, 92, so that the counter 78 in its turn may operate while the counters 79 and 96 remain zerofilled. The output of said gate 89 is also connected to an input of a gate 82, the second input of which is connected to the output of the inverter 81 mentioned above. The output of said gate 82 is through a gate 84 connected to the stores 85 and 86 and to an address counter 87 so that shifting to a new address in said stores 85 and 86 is produced.

The time interval between writing results in said stores 85 and 86 is determined by said trigger pulses supplied to the second input of the Set Reset flip flop 89, 90. By connecting the output of said gate 80 to said second input the highest writing speed is obtained corresponding to 360 ms. By supplying 1 m pulses being inverted to an input of said gate 80 writing in said store 85 stops, when the vehicle stops. Therefore, the store always contains the last recorded data while the vehicle was driving.

For transfer of the data stored in said stores 85 and 86 into said data transmitter 9 shown in FIG. 1 the memory 5 also comprises a gate 83 having an input connected to the inverter 81 mentioned above and having its output connected to an input of said gate 84 and to an input of said data transmitter 9. By supply of pulses to a second input of said gate 83, assuming the input of said inverter 81 and the said second input of said gate 83, are high, the data stored in said stores 85 and 86 are transferred to said data transmitter 9. The circuitry of the memory 5 is further constructed so that the results at the $Q^1$, $Q^2$, $Q^3$, and $Q^4$ outputs of said counter 79 may be transferred to a decoder not shown for transfer to a display displaying the actual speed of said vehicle. Naturally, the decoding of said results depends on the construction of said display being used.

The said trigger pulses being supplied to said gate 89 and thus to said set reset flip flop 89, 90 may instead be chosen so that the data stored in said store 85 may be used for determination of the drive of said vehicle within a period of time of 24 hours. The transfer of data from said store 85 into said data transmitter 9 is appropriately carried out within intervals of 24 hours.

Although the present invention has been described with reference to a specific embodiment shown in the drawings, it should be understood that numerous changes may be carried out within the scope of the present invention. Thus, by appropriate changes, the period of said pulses supplied by the gate 93 the counter 79 may be supplied with the distance pulses supplied by said signal generating device 3 directly.

I claim:

1. An electronic taximeter for use in a vehicle and comprising:
   a clock for generating time pulses,
   a signal generating device for generating distance pulses corresponding to a distance traveled by the vehicle,
   a proportional converter means which is connected to said clock and to said signal generating device for generating debit pulses from said time pulses and from said distance pulses supplied from said clock and from said signal generating device, respectively, and a fare program means which is connected to said proportional converter means for controlling the generation of said debit pulses such that in a first operational mode, said debit pulses are generated by adding, within a predetermined period of time corresponding to a predetermined number of time pulses, said predetermined number of time pulses and any number of distance pulses generated by said signal generating device within said predetermined period of time in excess of said predetermined number of time pulses, and such that in a second operational mode, said debit pulses are generated by adding, within said predetermined period of time corresponding to said predetermined number of time pulses, said predetermined number of time pulses and said number of distance pulses generated by said signal generating device within said predetermined period of time.

2. An electronic taximeter according to claim 1 further comprising a program means and a functional program means for causing automatic fare changes and for controlling the functions of the taximeter, respectively, said program means and said functional program means being connected to said fare program means and to one another.

3. An electronic taximeter according to claim 1 further comprising a memory for storing data supplied thereto from said fare program means.

4. An electronic taximeter according to claim 3 further comprising a data transmitter for transmitting, controlled by said clock, said data stored in said memory to a data recording or data processing unit.

5. An electronic taximeter according to claim 4 further comprising control registers for storing said data and further for outputting said data stored therein at predetermined times determined by said clock and to transfer said data to said data transmitter.

6. An electronic taximeter according to claim 5 further comprising a selector for shifting the taximeter into and out of one of said operational modes and for making the taximeter output said data stored in said registers and to transfer said data to said data transmitter.

7. An electronic taximeter according to claim 2, said signal generating device further comprising a magnetic armature, which is connected to and is driven by a speedometer linkage of the vehicle, a first reed contact for generating a number of pulses for each rotation of the speedometer linkage, and a second reed contact, said reed contacts being connected to a low potential (−) and a high potential (+) and being mounted relative to the rotational axis of said speedometer linkage angled 90° relative to one another so as to change between a neutral position and an activated position in which the movable contact elements of said reed contacts are connected to said low potential and to said high potential, respectively, and said signal generating device further comprising a blocking circuit for blocking, while the speedometer linkage is rotating, the admission of pulses from one of said two reed contacts after supply of one pulse, and simultaneously enabling the supply of pulses from the other reed contact.

8. An electronic taximeter according to claim 7, said signal blocking circuit comprises first, second, third, fourth and fifth gates, and first and second RC elements, said first and second gates being connected to said first and second reed contacts, respectively, through said first and second RC elements, respectively, said third and fourth gates together constituting a Set/Reset flip-flop being connected to said first and second gates and said fifth gate, and said fifth gate connected to said first and second gates for supplying at its output the pulses for each rotation of said speedometer linkage.

9. An electronic measuring and recording apparatus for use in a vehicle and comprising:
   a clock for generating a time signal,
   a signal generating device comprised of a magnetic armature being connected to and driven by a speedometer linkage of said vehicle, a first reed contact and a second reed contact for generating a number of pulses for each rotation of said speedometer linkage, said reed contacts being mounted relatively to the rotational axis of said speedometer linkage angled 90° relative to one another, and said reed contacts changing between a neutral position and an activated position in which the movable contact elements of said reed contacts are connected to a low potential and a high potential, respectively, said signal generating device further comprising a blocking circuit for blocking, while the speedometer linkage is rotating, the supply of pulses from one of the two reed contacts after supply of a single pulse and simultaneously enabling the supply of pulses from the other reed contact, said signal generating device generating a distance signal corresponding to a distance traveled by said vehicle, a converter means for converting said distance signal generated by said signal generating means into a price for a distance traveled by said vehicle and for converting said time signal generated by said clock into a price for a predetermined period of time, and
   an adder means for adding within said period of time, said price for said period of time and said price for said distance traveled by said vehicle within said period of time.

10. An apparatus according to claim 9, said signal generating device blocking circuit comprising first and second gates connected to said first and second reed contacts, respectively, third and fourth gates together constituting a Set/Reset flip-flop being connected to said first and second gates and a fifth gate connected to said first and second gates for supplying at its output the pulses for each rotation of said speedometer linkage.

* * * * *